Nov. 7, 1950 A. N. STANTON 2,529,430

TUNING FORK

Filed Jan. 28, 1950

INVENTOR.
AUSTIN N. STANTON
BY Walter J. Jagmin
ATTORNEY

Patented Nov. 7, 1950

2,529,430

UNITED STATES PATENT OFFICE 2,529,430

TUNING FORK

Austin N. Stanton, Garland, Tex.

Application January 28, 1950, Serial No. 141,109

3 Claims. (Cl. 84—457)

My invention relates to mechanically vibrating devices and more particularly to tuning forks.

In many applications, tuning forks are employed to generate an alternating current of substantially constant frequency, usually by means of an electro-magnetic pick up device. In some applications, very small tuning forks are employed in order to minimize weight and space requirements. Due to their small size these tuning forks must be driven at the largest practicable amplitude of vibration to obtain alternating current of the required magnitude. Tuning forks of conventional design dissipate considerable energy into the support on which the fork is mounted since the longitudinal component of vibration of the tuning fork tends to cause displacement of the stem of the tuning fork and of the support to which the stem is secured. The stability of the frequency of vibration of a tuning fork varies with the ratio of the amount of energy in the vibrating fork to the amount of driving power being applied to maintain the fork in vibration. Variations in the amount of energy dissipated through the longitudinal displacements of the stem of the tuning fork and its support change the stability of the frequency of vibration. This change will cause the frequency of vibration to change since the tuning fork is normally subjected to various external forces whose effect on the frequency of the fork will change with the change in the stability of the frequency of vibration. Since it is necessary that the tuning fork maintain as constant a freqeuncy of vibration as possible, it is desirable to minimize the amount of energy transmitted into the support from the tuning fork when it is in a state of vibration so that changes in the amount of energy transmitted into the support will necessarily be very small.

Accordingly, it is an object of my invention to provide a new and improved tuning fork.

It is another object of my invention to provide a new and improved tuning fork which transmits a minimum of energy into its support.

It is another object of my invention to provide a new and improved tuning fork whose frequency of vibration is substantially unchanged by variations in the mounting of the fork.

It is still another object of my invention to provide a new and improved tuning fork having a mounting which transmits a minimum of the longitudinal component of vibration of the tuning fork to the support on which the fork is mounted.

Briefly stated, in the illustrated embodiment of my invention I provide a new and improved tuning fork which comprises a U-shaped vibrating body having tines which flex toward and away from each other when the fork is in vibration. The motion of the U-shaped body has a longitudinal component parallel to the longitudinal central axis of the fork and a transverse component which is perpendicular to the longitudinal central axis of the fork. In order to eliminate or at least substantially reduce the energy transmitted into the support on which the U-shaped vibrating body is mounted by the longitudinal component of motion, I provide a pair of thin flat springs which are secured to the U-shaped vibrating body at points on the axis about which the body vibrates longitudinally. The pair of springs are in turn secured to any suitable support. Since the longitudinal component of motion is entirely absent or is of minimum value at the points of the U-shaped vibrating body at which the springs are secured, very little energy is transmitted from the U-shaped vibrating body to the support by the longitudinal component of motion of the U-shaped vibrating body. The leaf springs do not affect the transverse component of the vibration to any substantial degree since they flex with the transverse motion of the tines of the U-shaped vibrating body.

For a better understanding of my invention, reference may be had to the following description taken in connection with the accompanying drawing, and its scope will be pointed out in the appended claims.

Figure 1:
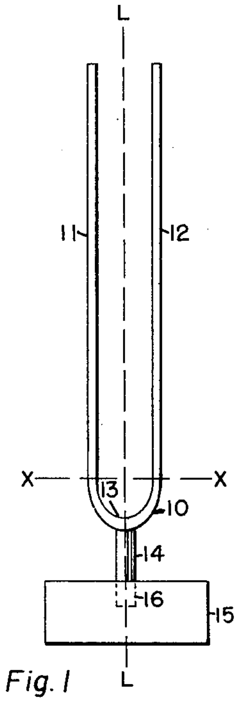
Figure 1 is a front view of a conventional tuning fork.

It has been long known that the vibration of the conventional tuning fork 10 of the type illustrated in Figure 1 is very complex. The tines 11 and 12 flex transversely toward and away from the central longitudinal axis LL of the fork 10 during vibration of the fork 10. Experimental studies have shown that the vibrational motion of the tines 11 and 12 can be resolved into two components, one of which is lateral or transverse to the longitudinal central axis LL and the other of which is parallel to axis LL. The longitudinal component of vibration of tines 11 and 12 causes the bight or base portion 13 of tuning fork 10 to tend to rise when tines 11 and 12 flex outwardly away from central longitudinal axis LL and to tend to lower when tines 11 and 12 move inwardly toward axis LL. Since the conventional tuning fork 10 is mounted by means of its stem 14 which is secured to bight or base portion 13, stem 14 also tends to rise and lower as tines 11 and 12 flex outwardly and inwardly, respectively.

The longitudinal vibration of base portion 13, therefore, causes a longitudinal vibration of stem 14 by means of which energy is transmitted to the support 15 in which stem 14 is mounted. Stem 14 may be mounted in support 15 by inserting it in a bore 16 provided in support 15 or by any other suitable mounting or clamping means.

The amount of energy transmitted to support 15 by the longitudinal component of motion of bight or base portion 13 depends on the closeness of fit of stem 14 in base 16, i. e., the rigidity of mounting of stem 14 on support 15, the mass and rigidity of support 15, the magnitude of the longitudinal component of vibration of base portion 13, the rigidity of mounting of support 15 in the environment in which it is to be employed, and perhaps on other factors. A variation in any one of the above factors will change the amount of energy transmitted to support 15 and will change the frequency of vibration of tuning fork 10.

Figure 3:
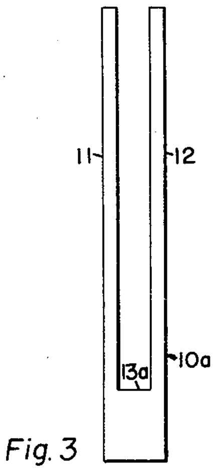

It will be noted that the conventional tuning fork 10 is mounted to its support 15 by means of stem 14 which is secured to the portion of the tuning fork 10, bight portion 13, which tends to have a very large longitudinal component of motion and therefore a large amount of energy is transmitted to support 15. The amount of energy transmitted to the support of a tuning fork may be minimized by employment of the conventional tuning fork 10a illustrated in Figure 3. The base portion 13a is a solid block and does not move appreciably in a longitudinal direction and therefore has a very small longitudinal component of motion. The fork 10a however is machined out of a solid block of metal and its cost of manufacture is relatively high. It is much more economical to bend a piece of flat stock into the U-shaped fork 10 and then mount it on a suitable support.

Figure 2:
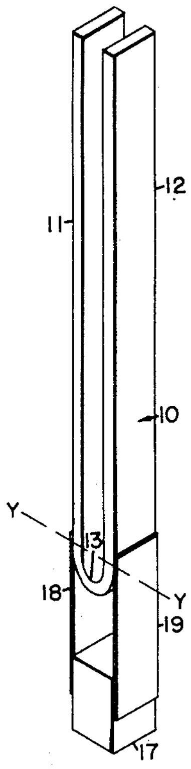
Figure 2 is a perspective view of a preferred embodiment of the tuning fork of my invention; and, Figure 3 is a front view of another conventional tuning fork.

In order to eliminate or reduce to a minimum the amount of energy transmitted to the tuning fork support by the longitudinal component of vibration of base portion 13, I secure the tuning fork 10 to a support 17 not by means of a stem 14 but by means of a pair of springs 18 and 19. Springs 18 and 19 are secured to tuning fork 10 at points along the axis about which the longitudinal component of vibration of tuning fork 10 is either zero or at least of a minimum value. The axis about which the longitudinal component of vibration of a tuning fork is either zero or is of minimum value can be determined experimentally by any suitable method, e. g., by the method disclosed by S. E. Michaels, Patent Number 2,247,960. The axis XX along which the longitudinal component of vibration of the conventional tuning fork illustrated in Figure 1 is of minimum value has been found to be at or near the point at which bight or base portion 13 straightens out and forms tines 11 and 12. As illustrated in Figure 2, springs 18 and 19 are secured to tuning fork 10 at points along an axis YY which has been experimentally determined to be the axis along which the longitudinal component of vibration of tuning fork 10 is of minimum value. Springs 18 and 19 are also secured to any suitable support 17 and may be secured to both fork 10 and support 17 by brazing, welding, or any other suitable means.

It will be observed that in the embodiment of my invention illustrated in Figure 2, bight or base portion 13 is free to vibrate longitudinally while the tuning fork 10 is free to vibrate transversely at the points on axis YY at which springs 18 and 19 are attached to tuning fork 10 since leaf springs 18 and 19 are adapted to flex laterally.

Since no or very little energy is transmitted to support 17 by the longitudinal component of vibration of tuning fork 10, the frequency of vibration of tuning fork 10 is largely independent of the mass and rigidity of support 17, and the rigidity of mounting of support 17 in the environment in which tuning fork 10 is to be employed. Moreover, the energy dissipation through support 17 is greatly decreased since no or very little energy is transmitted to support 17 by the longitudinal component of vibration of tuning fork 10 through springs 18 and 19.

The support 17 illustrated in Figure 2 may be omitted entirely if it be so desired and the springs 18 and 19 may be directly attached to a platform or base which is a part of the installation in which the tuning fork is to be employed. The springs 18 and 19 and support 17 may be made of a single piece of steel, the illustrated embodiment being preferred because of the ease and low cost of its manufacture.

While I have shown and described a particular embodiment of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. A tuning fork having a central bight portion and two tines integral with said bight portion symmetrically positioned about a longitudinal axis, said tuning fork having a longitudinal component of vibrational motion parallel to said longitudinal axis; and a pair of laterally resilient supporting members fastened to said fork on opposite sides of said bight portion at points of substantially minimum value of the longitudinal component of vibrational motion of said tuning fork, said members lying parallel to said longitudinal axis.

2. A mechanical vibrator comprising a body of elastic material symmetrical about a longitudinal axis and having two extensions of similar conformation extending in the same direction and parallel to said longitudinal axis, said body having a longitudinal component of vibrational motion parallel to said longitudinal axis; and a pair of flexible members for supporting said body secured to said body at points of substantially minimum value of the longitudinal component of vibrational motion, said flexible members allowing vibrational motion of said body perpendicular to said longitudinal axis.

3. A tuning fork comprising a central bight portion and two tines integral with said bight portion, and support means comprising a pair of resilient members secured to said fork at points adjacent the junction of said tines with said central bight portion.

AUSTIN N. STANTON.

REFERENCES CITED

The following references are of record in the file of this patent:

UNITED STATES PATENTS

| Number | Name | Date |
|---|---|---|
| 2,469,951 | Cooley | May 10, 1949 |